Jan. 5, 1943.  J. F. KOVALSKY  2,307,515
REGULATING SYSTEM
Filed Dec. 2, 1941  2 Sheets-Sheet 1
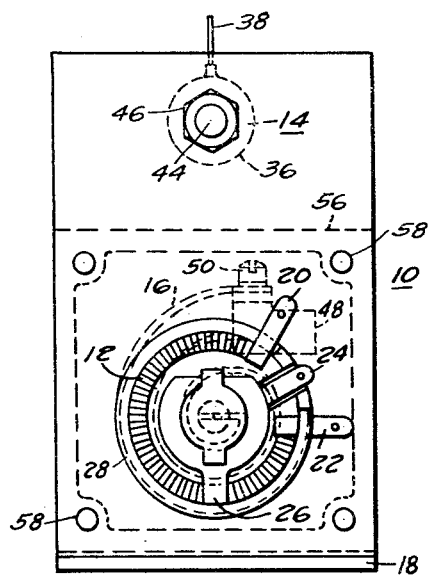
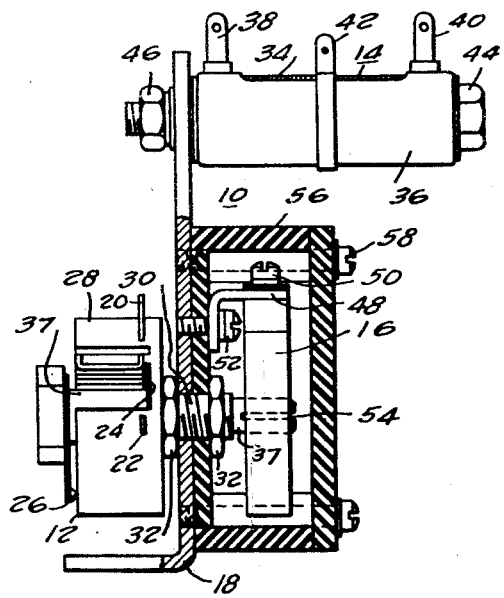
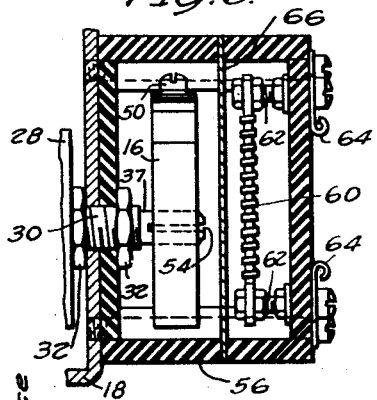
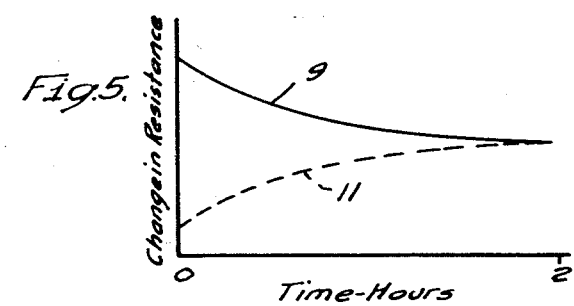
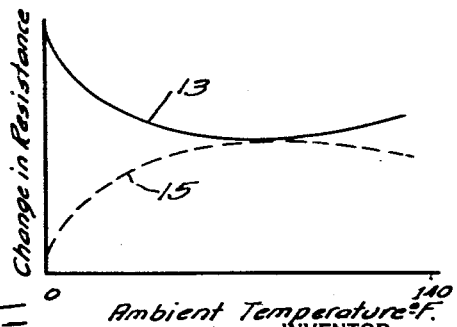
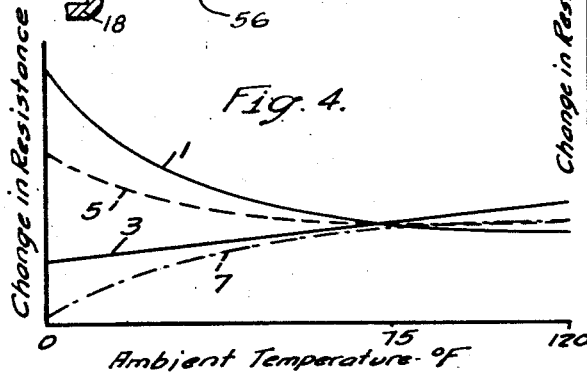
INVENTOR
Joseph F. Kovalsky.
BY
James N. Ely
ATTORNEY Jan. 5, 1943.   J. F. KOVALSKY   2,307,515
REGULATING SYSTEM
Filed Dec. 2, 1941   2 Sheets-Sheet 2
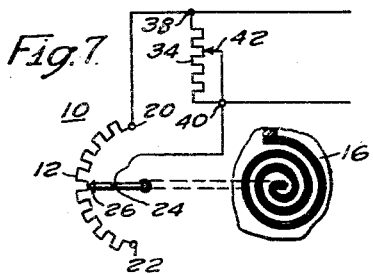
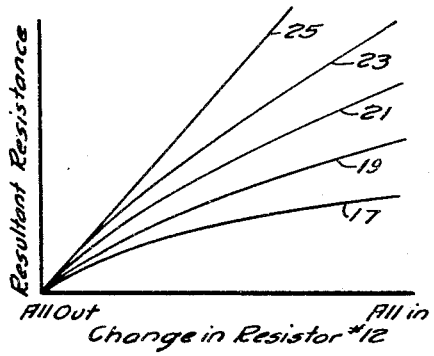
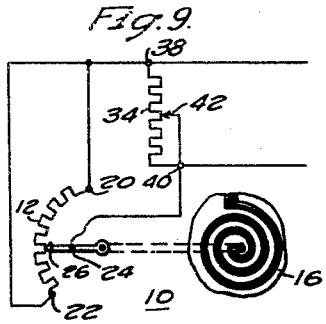
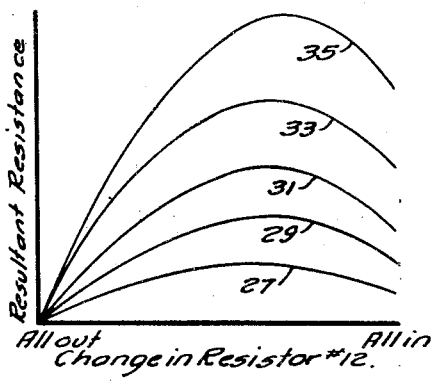
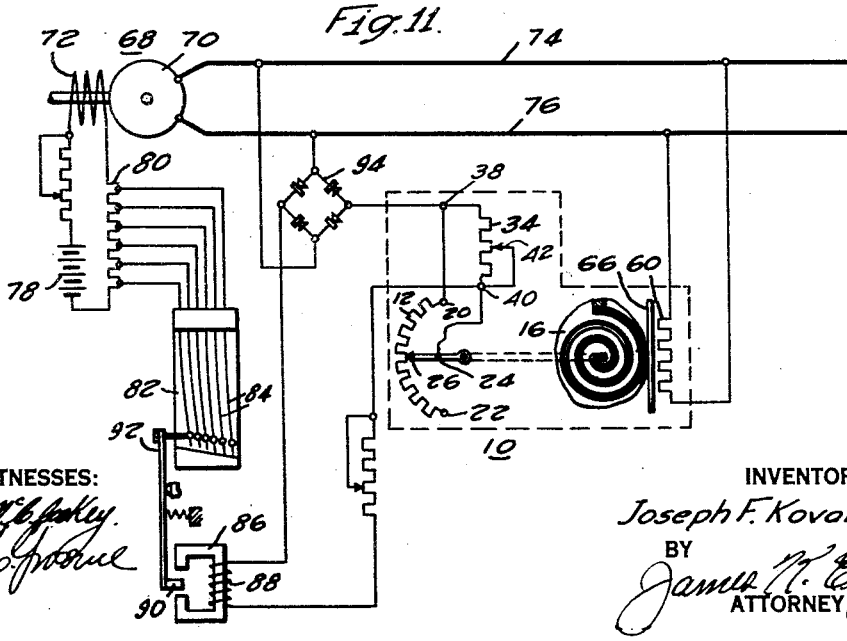
WITNESSES:
INVENTOR
Joseph F. Kovalsky.
BY
ATTORNEY Patented Jan. 5, 1943

2,307,515

UNITED STATES PATENT OFFICE 2,307,515

REGULATING SYSTEM

Joseph F. Kovalsky, Turtle Creek, Pa., assignor to Westinghouse Electric & Manufacturing Company, East Pittsburgh, Pa., a corporation of Pennsylvania Application December 2, 1941, Serial No. 421,309

6 Claims. (Cl. 171—119)

This invention relates to electrical apparatus and, particularly, to voltage regulating systems for dynamo-electric machines.

Voltage regulators are employed with dynamo-electric machines for maintaining constant voltage across a given load and have been so developed that they are capable of maintaining such constant voltage for a given range of operating temperatures ranging from about 72° F. upwardly. However, in some cases, the voltage regulator must operate over a range of temperatures from 0° F. no load to approximately 120° F. full load.

The regulators and regulating systems provided heretofore are not satisfactory for operation over such a wide range of operating temperatures as the resistance characteristics of the regulators and regulating systems change with changing temperatures. Under these conditions, the resistance of the voltage regulating apparatus is not constant enough to give stable operation of the voltage regulator to maintain a constant voltage on the dynamo-electric machine, errors as large as 8 to 10% in the controlled voltage being obtained in operating the prior art regulators and regulating systems over operating temperatures ranging from 0 to 120° F. ambient temperature.

An object of this invention is to provide in a regulating system for a dynamo-electric machine for compensating for changes in resistance of the regulator occasioned by changes in operating temperature, and thereby maintain substantially constant voltage on the machine.

Another object of this invention is to provide in a temperature responsive device for a regulating system for connecting different sections of a plurality of resistor units in parallel circuit relation as changes in temperature occur to give the device predetermined operating characteristics.

Other objects of this invention will become apparent from the following description when taken in conjunction with the accompanying drawings, in which:

Figure 1 is a view in elevation of a temperature responsive device embodying the teachings of this invention;

Fig. 2 is a side elevational view partly in section of the apparatus of Fig. 1;

Fig. 3 is a side elevational view partly in section of another embodiment of the temperature responsive device;

Fig. 4 is a graph, the curves of which illustrate errors of the type which occur in regulating apparatus occasioned by change in operating temperatures;

Fig. 5 is a graph, the curve of which illustrates a change in resistance with a change in temperature over a period of time which is found in certain apparatus generally utilized in regulating systems for transposing alternating current to direct current;

Fig. 6 is a graph, the curve of which illustrates the change of resistance with a change in temperature for certain types of regulators;

Fig. 7 is a schematic representation of one of the embodiments of the temperature responsive device utilized in accordance with this invention for compensating for errors of the type illustrated in Fig. 4;

Fig. 8 is a graph, the curves of which illustrate the resultant resistance characteristics of the temperature responsive device of Fig. 7 obtained by changing the connections of the resistors.

Fig. 9 is a schematic representation of another embodiment of the temperature responsive device utilized in accordance with this invention for compensating for errors of the type illustrated in Fig. 6;

Fig. 10 is a graph, the curves of which illustrate the resultant resistance characteristics of the temperature responsive device of Fig. 9 obtained by changing the connections of the resistors; and Fig. 11 is a schematic diagram of a voltage regulating system embodying the teachings of this invention.

Referring to Figs. 1 and 2, this invention is illustrated by reference to a temperature responsive device 10 utilized for compensating for resistance changes in regulating systems in accordance with this invention. The temperature responsive device 10 comprises a plurality of adjustable resistors 12 and 14 and a temperature responsive element 16 secured to a suitable base member 18.

Each of the adjustable resistors 12 and 14 are of standard design, the resistor 12 being of the sliding contact type and provided with end terminals 20 and 22 and a mid terminal 24. The mid terminal 24 is in sliding electrical engagement with a conducting sleeve 37 insulated from but carried by a spindle 39. A movable contact finger 26 is in electrical engagement with the conducting sleeve 37 disposed to be actuated as the spindle is moved to slidably engage the resistor 12. In order to mount the resistor 12 on the base 18, the resistor 12 is carried in a suitable housing 28 as illustrated in Fig. 2 which is mounted on a hollow stud 30 which projects through a suitable opening in the base 18. The nuts 32 carried on the hollow stud 30 on each side of the base member 18 are tightened to secure the resistor in operative position with respect to the base member.

The adjustable resistor 14 may be of any standard make, and in this embodiment comprises a spiral wound resistor element 34 positioned in a protective insulating housing 36 and provided with end terminals 38 and 40 and a slidable mid terminal 42 disposed to engage the turns of the resistor element 34. In practice, the resistor 14 is mounted on the base member 18 by means of the bolt 44 extending through the resistor 14 and through a suitable opening in the base 18, a nut 46 being provided for engaging the end of the bolt 44 and holding the resistor 14 in its operative position.

The thermal responsive element 16 is in the form of a spiral bimetal having one of its ends secured to a bracket 48 as by means of the screw 50. The other end of the bracket is secured to the base member 18 in any suitable manner or as shown, by the screw 52. In order to control or regulate the movement of the contact finger 26 of the resistor 12, the end of the spindle 39 opposite the end which carries the sleeve 37 and the contact finger 26 is disposed to extend through the hollow stud 30 and is provided with a slot 54, as illustrated in Fig. 2. The inner end of the spiral bimetal element 16 is then positioned in the slot 54 of the spindle and secured thereto in any suitable manner. In practice, a housing 56 of insulating material is provided about the bimetal element 16 and is secured to the base member 18, as by means of the screw members 58 projecting therethrough.

In an embodiment of this invention where it is desired to apply heat in a predetermined manner to the bimetal element 16, a heater element 60 is provided within the housing. As illustrated in Fig. 3, where the heater element 60 is utilized, the housing is modified somewhat, the cover being adapted to carry the heater element 60. In this embodiment, the heater element 60 is mounted on conducting studs 62 which project through the cover of the housing 56 and are in electrical contact with terminals 64 provided externally of the cover.

As will be explained more fully hereinafter, it is necessary to provide a time delay in the heating of the bimetallic element 16 to the predetermined temperature of the heat developed by the heater element 60. In order to provide such a time delay or thermal lag, a plate 66 of thermally conducting material, such as copper, is disposed within the housing 56 between the heater element 60 and the bimetallic member 16, suitable openings (not shown) being provided in the plate 66 for permitting the bolts 58 to pass therethrough. The thermal lag obtained through the use of the copper plate 66 will depend upon the thickness of the copper plate, the thickness readily being determined experimentally, depending upon the heat developed by the heating element 60 and the thermal lag which it is desired to obtain before the bimetal element 16 is heated to the predetermined temperature of the heating means.

Referring to Fig. 11 of the drawing, the thermal responsive device 10 is utilized in a voltage regulating system for maintaining the voltage of an alternating current generator 68 substantially constant. As illustrated, the generator 68 comprises the armature winding 70 and the separately excited field winding 72 and is disposed to be driven by any suitable source of power, such as a motor (not shown). The generator 68 is connected by conductors 74 and 76 to any suitable load (not shown) for delivering power thereto at a constant voltage.

The field windings 72 are connected to a suitable source of power, such as the battery 78, through a variable rheostat 80, the rheostat 80 being disposed to be operated to control the energization of the field winding.

As illustrated, the rheostat 80 comprises a plurality of resistor sections disposed to be connected in series circuit relation with the field winding 72, the operation of the rheostat 80 being controlled by a switching apparatus 82 formed of a plurality of spring biased leaf members 84 of the type fully described in Patent No. 2,246,301, issued June 17, 1941, to C. R. Hanna et al. and assigned to the same assignee as this invention.

In order to effect a switching operation of the switching apparatus 82 an electromagnetic device is provided. The electromagnetic device may be of any suitable construction and comprises a core member 86 having an actuating winding 88 thereon and an armature member 90 which carries a driver member 92 disposed for movement when the actuating winding 88 is energized.

In order that the operation of the switching apparatus 82 may be a function of the voltage of the generator 70, the actuating winding 88 of the electromagnetic device is connected across the generator 68 through a copper-oxide rectifier 94 which is utilized for delivering direct current to the winding 88. As illustrated, the thermal responsive device 10 is connected in the actuating winding circuit between the copper-oxide rectifier 94 and the actuating winding 88. The heating element 60 of the thermal responsive device 10 is also connected across the conductors 74 and 76 to be energized at the same time that the actuating winding circuit is energized.

In order to understand the operation of the subject matter of this invention, reference may now be had to the curves of Fig. 4 of the drawings. In this figure, curve 1 represents the temperature error or change of resistance of the copper-oxide rectifier 94 generally employed in regulating systems over a range of ambient temperatures after the rectifier is heated to its ultimate operating temperature while curve 3 represents the temperature error, under the same conditions, of the copper windings of the actuating winding 88 and other apparatus such as a feed-back transformer (not shown) generally included in the actuating winding circuit f the regulator. As is evident from Fig. 4, the temperature errors represented by curves 1 and 3 are in opposition, and if the apparatus is properly designed, a resultant change in resistance for the actuating winding 88 and the circuit including the copper-oxide rectifier 91 can be had, as represented by the curve 5 of Fig. 4. As illustrated, the resultant resistance of such a circuit is a non-linear variable for changes in temperature ranging from 0° F. up to about 75° F. From 75° F. up to about 140° F., the resultant resistance of the actuating winding circuit including the rectifier is substantially a constant, so that substantially no temperature error is found for this portion of the range of operating temperatures. Because of the change in resistance, as represented by curve 5, between the operating temperatures of 0 up to about 75° F., it is necessary to compensate for such changes as by introducing another change of resistance in the actuating winding 60, as represented by the curve 7, which shall be equal and opposite to the change, as represented by curve 5, for changes in operating temperature up to 75° F.

Referring to Fig. 5, there is illustrated another type of error which exists where apparatus such as the copper-oxide rectifier 94 is employed in the actuating winding circuit of the regulator when such apparatus is utilized in cold climates. As illustrated by curve 9, the resistance of the copper-oxide rectifier 91 decreases for an increase in temperature at a constant ambient temperature up to the ultimate operating temperature of the apparatus, such decrease being found to exist for periods of time of up to approximately two hours before the rectifier becomes so heated due to the flow of current to the actuating winding 88 as to eliminate this type of error. It is, therefore, necessary to introduce a compensating resistance which has a change in resistance equal and opposite to the change in resistance of the copper-oxide rectifier for this type of error. Such compensating resistance can be represented by the curve 11, it being noted that when the changes in resistance represented by curves 9 and 11 are balanced that the combined resultant resistance will be substantially a constant for the period of time in which it takes the rectifier to heat up to its ultimate temperature.

As distinguished from the error represented by curve 5 of Fig. 4, it is possible that the resultant resistance changes due to change in ambient temperature after the apparatus is heated to its ultimate operating temperature might have a temperature error, as represented by the curve 13 of Fig. 6. Such temperature errors are found where the actuating winding circuit of the regulator includes apparatus in which the ratio of the copper windings to the resistance of the copper-oxide rectifier is such that the output at high temperature has a rising characteristic. In such cases, it is, therefore, necessary to introduce a compensating resistance in the actuating winding circuit which will have a change in resistance, as represented by the curve 15 of Fig. 6 and have a drooping effect at the high temperatures.

Referring to Fig. 7, there is schematically represented a temperature responsive device 10 suitable for compensating for the change in resistance of the actuating winding circuit represented by the curve 5 of Fig. 4. In this figure, the resistor elements 12 and 34 are connected in parallel circuit relation, a predetermined section of the resistor element 34 being connected in the circuit by adjusting the terminal or tap 42. The amount of the resistor element 34 connected in the circuit is determined by the slope of the curve 5 of Fig. 4, since the non-linear curve 7 representing the resultant resistance of the parallel connected resistors is to be equal and opposite the curve 5. Having the slope of curves 5 and 7 the amount of resistor element 34 to be connected in the circuit can readily be determined from the equation $$R = \frac{R_1 \times R_2}{R_1 + R_2}$$

where $R_1$ represents the portion of the resistor 34 in the parallel circuit, and $R_2$ represents the portion of the resistor 12 in the parallel circuit.

In the embodiment illustrated in Fig. 7, if the apparatus is operating at a temperature of about 0° F., the bimetallic element is in its cold position where the contacting finger 26 is adjacent the terminal 20 so that very little of the resistor 12 is connected in the parallel circuit of the temperature responsive device. The adjustable terminal 42 of the resistor element 34 having been adjusted to some predetermined position to connect a predetermined amount of the resistor 34 in the parallel circuit depending upon the slope of the curve 5, any increase in the ambient temperature which would change the resistance of the actuating winding circuit including the rectifier also affects the bimetal member to cause it to expand and effect a counterclockwise movement of the contact finger 26 along the resistor 12 to connect additional amounts or sections of the resistor 12 in parallel with the portion of the resistor 34 to give a predetermined non-linear resistance change which follows the slope of curve 7 of Fig. 4.

The predetermined non-linear resistance which is obtained through the use of the temperature responsive device 10 of Fig. 7 for given changes in the amount of the resistance 12 connected in parallel in the circuit for definite and different amounts of the resistor 34 is represented by the curves of Fig. 8. In this graph, each of curves 17, 19, 21, 23, and 25 represents the resultant resistance obtained by a change in the connections to resistor 12, as the contact finger 26 moves from terminal 20 to terminal 22 for different amounts of the resistor 34 connected in the parallel circuit. As illustrated, as the terminal 42 is moved along the resistor 34 to connect larger amounts of the resistor 34 in the parallel circuit with resistor 12, the slope of the curves 17 through 25 becomes steeper, until with the amount of resistor 34 being an infinity, the curve 25 becomes a straight line.

If the regulating winding circuit, however, has such a ratio of copper to the resistance of the rectifier that the output at high temperature has a rising characteristic, as illustrated by curve 13 of Fig. 6, then the temperature responsive device 10 illustrated in Fig. 9 is employed for compensating for the change in resistance of the actuating winding circuit. In this embodiment, the resistor element 12 is so connected in parallel circuit relation with the resistor element 34, that, in effect, as the contact finger 26 is actuated from terminal 20 to terminal 22, the resistor element 12 forms two variable resistor sections which are connected in parallel circuit relation with one another and with the resistor element 34. In this embodiment, with the regulating system operating at temperatures from 0° F. up to 120° F., as the ambient temperature increases from 0° F., the bimetal element 16 actuates the contact finger 26 along the resistor element 12 towards the terminal 22. The operation of the contact finger 26 effects a simultaneous and inverse change in the amount of resistance of the two resistor sections formed by the resistor 12 which are connected in parallel with the resistor 34.

The slope of the curve obtained by such a change can be predicted by the equation $$R = \frac{1}{1/R_1 + 1/R_2 + 1/R_3}$$

the resultant resistance represented by the curves 27, 29, 31, 33, and 35 of Fig. 10 being obtained for different values of the resistor 34 connected in the circuit for changes in the ambient temperature. In this equation, $R_1$ represents the portion of the resistor 34 connected in the parallel circuit, $R_2$ represents the resistor section between terminal 20 and contact finger 26 of the resistor element 12, and $R_3$ represents the resistor section between the terminal 22 and contact finger 26 of the resistor 12 which are connected in the parallel circuit. As illustrated for different values of the resistor 34, a resultant resistance is obtained having different slopes and different peaks of resistance, so that a resultant resistance having a predetermined change in resistance characteristic which will match the curve 15 of Fig. 6 can be obtained.

Again referring to Fig. 11, assuming that the ratio of the copper windings in the actuating winding circuit to the resistance of the copper-oxide rectifier 94 included in the circuit is such that the output at high temperature has a drooping characteristic, as represented by the curve 5 of Fig. 4, the thermal responsive device 10 of Fig. 7 is connected in the actuating winding circuit for compensating for the change in resistance of the actuating winding circuit including the rectifier.

In operation, assuming that the generator 68 is driven at a constant speed by some suitable source of power, such as a motor not shown, the voltage across the generator for a given load is a constant. In starting the generator 68, the regulating system first becomes active as the generator 68 delivers power to a load, not shown. Thus, the actuating winding 68 is energized in accordance with the voltage across the generator 68, and since the regulating system may be energized at as low a temperature as below 0° F., the characteristics of the copper-oxide rectifier 94 included in the actuating winding circuit of the regulating system change as the actuating winding 88 becomes energized. However, because of the construction of the rectifier, such changes in its resistance characteristics is slow, generally taking a period of about two hours before the rectifier 94 becomes heated to its ultimate temperature of 0° F. or higher.

Therefore, in the embodiment illustrated in Fig. 11, the heater element 60 of the temperature responsive device 10 is connected across the conductors 74 and 76, so as to be energized at the same time that the actuating winding circuit of the regulating system is energized. Because of the inclusion of the copper plate 66 between the bimetal element 16 and the heater element 60, a thermal lag equivalent to the period of time in which it takes the copper-oxide rectifier 94 to become heated to its ultimate temperature of 0° F. or higher is introduced in the heating of the bimetal element 16 to the ultimate temperature of the heating element 60. As the bimetal element 16 is heated at approximately the same rate in which the rectifier 94 becomes heated, the contacting finger 26 of the resistor element 12 is actuated to connect additional portions of the resistor 12 in the parallel circuit with resistor element 34 to give a resultant change in resistance of the parallel connected resistors 12 and 34 which is equal and opposite to the change in the resistance of the rectifier 94 during the period of time in which the rectifier is heated to its ultimate temperature. Thus, in effect, the temperature responsive device 10 compensates for the change in resistance of the copper-oxide rectifier, as the rectifier becomes heated to its ultimate temperature of 0° F. or higher.

Assuming that the generator is delivering power to a load, now shown, and that the copper-oxide rectifier 94 and the windings of the actuating winding circuit have become heated to their ultimate temperature, if for any reason the load should change so as to effect a decrease in the voltage across the generator, then the actuating winding 88 of the electromagnetic device 86 is so deenergized that the driver member 92 is moved to actuate the spring bias switching members 84 of the switching apparatus 82 to shunt a predetermined number of the sections of the field winding rheostat 80 to increase the energization of the field winding 72 and thereby effect an increase in the voltage across the generator 68.

If during the operation of the regulating system after the apparatus is heated to its ultimate temperature of 0° F. or higher, the ambient temperature of the regulating system is changed, as by reason of an increase in the room temperature in which the apparatus is located, the resultant resistance of the actuating winding circuit including the rectifier is also changed so as to normally affect the energization of the actuating winding 88. However, by reason of the temperature responsive device 10 connected in the actuating winding circuit, a change in the ambient temperature also affects the bimetal element 16 to actuate the contact finger 26 to change the connection to the resistor 12, whereby the resultant resistance of the temperature responsive device 10 also changes in an amount equal and opposite to any change in the actuating winding circuit including the rectifier 94. In effect, such changes in the resultant resistance of the temperature responsive device being equal and opposite to the changes in the resultant resistance of the actuating winding circuit including the rectifier 94 gives the actuating winding circuit a substantially constant resultant resistance.

If the load supplied by the generator 68 is decreased so as to effect an increase in the voltage across the generator, then the actuating winding 88 is so energized as to actuate the armature 90 and the driver member 92 carried thereby in a direction to effect the release of the spring biased leaf members 84 of the switching apparatus 82 to progressively connect additional sections of the field winding rheostat 80 in circuit with the field winding 72 to decrease the energization of the field winding 72 and, consequently, decrease the voltage across the generator 68. The temperature responsive device 10 functions in the regulating system for all operations thereof to give a resultant resistance in the actuating winding circuit thereof which is substantially constant for all changes in temperature whether such changes are due to heating of the apparatus in the regulating winding circuit or due to changes in ambient temperature.

By utilizing the temperature responsive device in the regulating system, as described hereinbefore, substantially constant voltage is obtained across the generator, the voltage of which is being regulated. In practice, where the temperature changes range from 0° F. up to between 120° and 140° F., the voltage of the generator is found to be maintained constant within plus or minus .5%. The apparatus is economical, being constructed of standard equipment and functions to give a regulating system superior to the systems known heretofore.

Although this invention has been described with reference to a particular embodiment thereof, it is, of course, not to be limited thereto except insofar as is necessitated by the scope of the appended claims.

I claim as my invention:

1. In a voltage regulating system, in combination, a generator the voltage of which is to be regulated, the generator being provided with a field winding, a rheostat for controlling the voltage impressed on the field winding, means for actuating the rheostat, the rheostat actuating means comprising a winding connected in circuit across the generator, the winding and circuit across the generator having a resistance variable with changes in temperature, and means connected in the actuating winding circuit for compensating for the change in resistance of the winding and circuit to maintain the effective resistance of the actuating winding circuit substantially constant over a wide range of operating temperatures, the compensating means comprising a plurality of resistors connected in parallel circuit relation with one another, the connection to one of the resistors being adjustable, and means responsive to changes in temperature for effecting the adjustment of the connection to said one of the resistors to change the resistance connected in parallel circuit relation with the other resistor.

2. In a voltage regulating system, in combination, a generator the voltage of which is to be regulated, the generator being provided with a field winding, rheostat for controlling the voltage impressed on the field winding, means for actuating the rheostat, the rheostat actuating means comprising a winding connected in circuit across the generator, the winding and circuit across the generator having a resistance variable with changes in temperature and means connected in the actuating winding circuit for compensating for change in resistance of the winding and circuit to maintain the effective resistance of the actuating winding circuit substantially constant over a wide range of operating temperatures, the compensating means comprising a plurality of resistors connected in parallel circuit relation with one another, the connection to one of the resistors being adjustable, means responsive to changes in temperature for effecting the adjustment of the connection to said one of the resistors to change the resistance connected in parallel circuit relation with the other resistor, a heating element associated with the temperature responsive means disposed to supply heat at a predetermined temperature thereto, and means disposed between the temperature responsive means and the heating element to effect a time delay in heating the temperature responsive means to the predetermined temperature of the heat supplied by the heating means.

3. In a voltage regulating system, in combination, a generator the voltage of which is to be regulated, the generator being provided with a field winding, a rheostat for controlling the voltage impressed on the field winding, means for actuating the rheostat, the rheostat actuating means comprising a winding connected by a circuit including a rectifier across the generator, the winding and the circuit including the rectifier having a resultant resistance variable over a portion of the range of operating temperatures of the actuating means, and means connected in the actuating winding circuit for compensating for the change in resistance of the circuit to maintain the resistance thereof substantially constant over a wide range of operating temperatures, the compensating means comprising a plurality of resistors connected in parallel circuit relation with one another, the connection to one of the resistors being adjustable, and means responsive to changes in temperature for effecting the adjustment of the connection to said one of the resistors to change the resistance connected in parallel circuit relation with the other resistor to give a resultant resistance for the parallel connected resistors which is variable over the same portion of the range of operating temperatures as the resultant resistance of the actuating winding circuit, the change in the resultant resistance of the parallel connected resistors being substantially equal and opposite to the change in the resultant resistance of the actuating winding circuit over the same range of operating temperatures.

4. In a voltage regulating system, in combination, a generator the voltage of which is to be regulated, the generator being provided with a field winding, a rheostat for controlling the voltage impressed on the field winding, means for actuating the rheostat, the rheostat actuating means comprising a winding connected by a circuit including a rectifier across the generator, the winding and circuit including the rectifier having a resultant resistance variable over a portion of the range of operating temperatures of the actuating means, and means connected in the actuating winding circuit for compensating for the change in resistance of the circuit, the compensating means comprising a plurality of resistors connected in parallel circuit relation with one another, the connection to one of the resistors being adjustable, means responsive to changes in temperature for effecting the adjustment of the connection to said one of the resistors to change the resistance connected in parallel circuit relation with the other resistor, a heating means associated with the temperature responsive means disposed to heat it to a predetermined temperature, and means disposed between the temperature responsive means and the heating means for providing a thermal lag in the heating of the temperature responsive means to the predetermined temperature by the heating means, the temperature responsive means being effective for changing the resultant resistance of the parallel connected resistors in opposition to the change of the resultant resistance of the actuating winding and circuit including the rectifier to maintain the effective resistance of the circuit substantially constant over a wide range of operating temperatures.

5. In a voltage regulating system, in combination, a generator the voltage of which is to be regulated, the generator being provided with a field winding, a rheostat for controlling the voltage impressed on the field winding, means for actuating the rheostat, the rheostat actuating means comprising a winding connected by a circuit including a rectifier across the generator, the winding and circuit including the rectifier having a resultant resistance variable over a portion of the range of operating temperatures of the actuating means, and means connected in the actuating winding circuit for compensating for the change in resistance of the circuit, the compensating means comprising three resistors connected in parallel circuit relation with one another, the connection to two of the resistors being adjustable, and means responsive to changes in temperature for effecting the adjustment of the connection to said two of the resistors to simultaneously and inversely change the resistance of said two resistors to change the resultant resistance of the three parallel connected resistors, the change in the resultant resistance of the parallel connected resistors being substantially equal and opposite to the change in the resultant resistance of the actuating winding and circuit including the rectifier to maintain the effective resistance of the circuit substantially constant over a wide range of operating temperatures.

6. In a voltage regulating system, in combination, a generator the voltage of which is to be regulated, the generator being provided with a field winding, a rheostat for controlling the voltage impressed on the field winding, means for actuating the rheostat, the rheostat actuating means comprising a winding connected by a circuit including a rectifier across the generator, the winding and circuit including the rectifier having a resultant resistance variable over a portion of the range of operating temperatures of the actuating means, and means connected in the actuating winding circuit for compensating for the change in resistance of the circuit, the compensating means comprising three resistors connected in parallel circuit relation with one another, the connection to two of the resistors being adjustable, means responsive to changes in temperature for effecting the adjustment of the connection to said two of the resistors to simultaneously and inversely change the resistance of said two resistors to change the resultant resistance of the three parallel connected resistors, a heating means associated with the temperature responsive means disposed to heat it to a predetermined temperature, and means disposed between the temperature responsive means and the heating means for providing a thermal lag in the heating of the temperature responsive means to the predetermined temperature by the heating means, the temperature responsive means being effective for changing the resultant resistance of the parallel connected resistors in opposition to the change of the resultant resistance of the actuating winding and circuit including the rectifier to maintain the effective resistance of the circuit substantially constant over a wide range of operating temperatures.

JOSEPH F. KOVALSKY.